Dec. 16, 1969        E. LONGINOTTI         3,484,514
PROCESS FOR MOLDING DECORATIVE CEMENT SLABS
Filed Nov. 22, 1966                     2 Sheets-Sheet 1
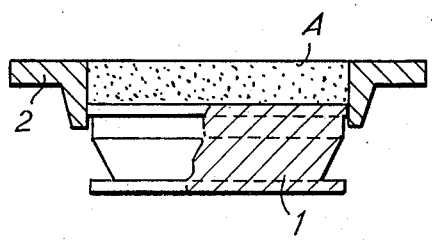
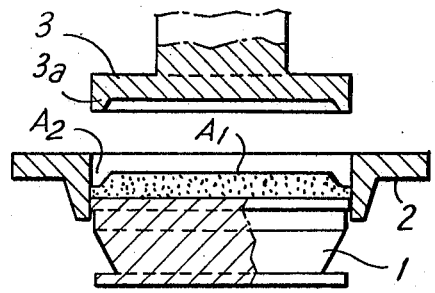
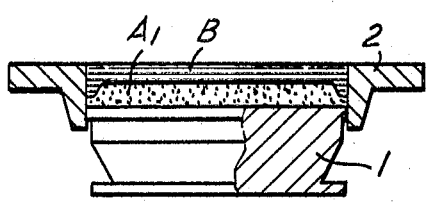
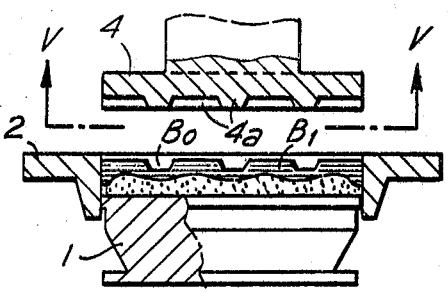
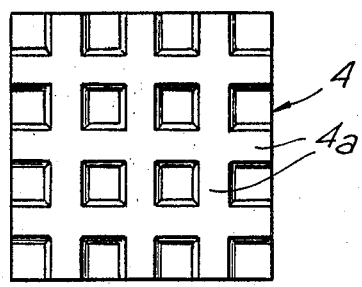
INVENTOR:
ENRICO LONGINOTTI
BY
E. M. Squire
HIS ATTY Dec. 16, 1969  E. LONGINOTTI  3,484,514
PROCESS FOR MOLDING DECORATIVE CEMENT SLABS
Filed Nov. 22, 1966  2 Sheets-Sheet 2
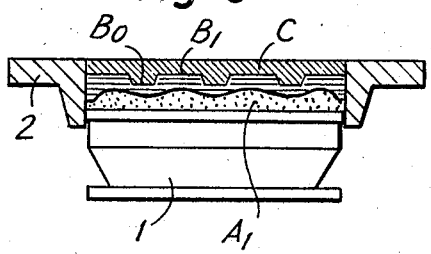
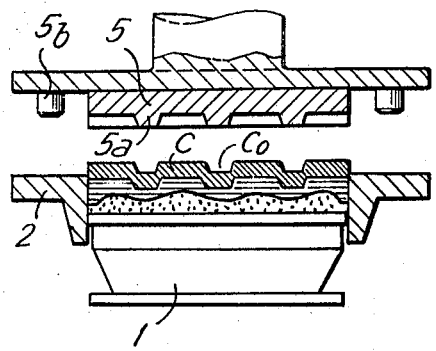
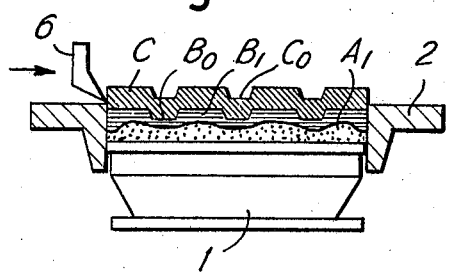
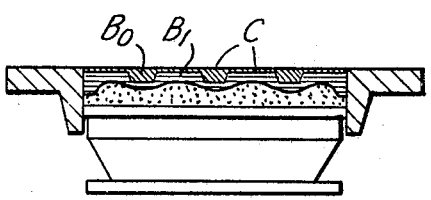
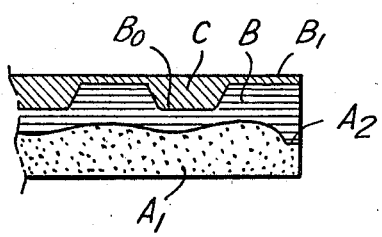
INVENTOR:
ENRICO LONGINOTTI
BY E. M. Squire
HIS ATTY.

United States Patent Office 3,484,514
Patented Dec. 16, 1969

3,484,514
PROCESS FOR MOLDING DECORATIVE CEMENT SLABS
Enrico Longinotti, Viale Donato Giannotti, 75, Florence, Italy
Filed Nov. 22, 1966, Ser. No. 596,132
Claims priority, application Italy, Nov. 30, 1965, 26,904/65
Int. Cl. B28b *3/10;* B29c *9/00*
U.S. Cl. 264—163                                     1 Claim

ABSTRACT OF THE DISCLOSURE

A process for molding cement slabs, ceramic slabs, and the like, having a pattern. According to the process a dry powder having a very small degree of moisture but sufficiently moist to set after pressing is placed in an open mold. The dry powder is slightly pressed by an engraved pad to form impressions on the surface of the dry powder. The recesses in the impressions are then filled with a differently colored material. A second layer of said different colored material is laid on the first layer of colored material and is pressed on the first colored layer, the excess material of the second colored layer being removed by a tool. The material in the mold is than finally pressed into slab-like form.

---

The invention relates to a process for carrying out a molding of cement slabs, ceramic slabs or the like offering a pattern; in said process provisions are made to introduce the material in a mould under form of substantially dry powder, that is with a very small degree of moisture, that is, that the water percentage in weight in respect of the cement powder is very low so that the cement remains apparently dry and loose, the moisture being only sufficient for the setting after pressing.

According to the invention, a bottom material introduced into the mould is subjected to a preliminary light pressing, by means of an appropriately engraved pad to obtain a corresponding impression on the material, besides an appropriate ramming; the recesses of said impression are then filled with a differently coloured material, before the final pressing.

More particularly, in order to fill the recesses of the impression with a second differently coloured material, with respect to that of the bottom material, an additional layer of the second material is distributed on the bottom layer pressed on the impression; said additional layer is then pressed in the zones corresponding to the recesses of the impression in the first layer; the excess material of said second additional layer is then removed before the final pressing, the material of the second layer is eliminated at least up to the bottom of the impressions formed therein, and/or to such an extent as to let a thin thickness on the more projecting portions of the bottom layer.

For economic reasons, an underlying material, having a minor value in respect of the materials forming the visible surfaces, is advantageously used, and in this case, an underlying layer is rammed by a pad which imposes a stronger pressure or pressing on the material along the periphery; a second bottom layer is then introduced into the mould and pressed as stated before, to obtain the impressions for the pattern.

The invention also relates to a patterned cement slab, obtained by the aforesaid process.

In the drawings the molding process is diagrammatically shown with the different moulding members which follow one another during the cycle. In particular:

FIG. 1 illustrates the mold filled with the underlying material;

FIG. 2 illustrates the mold after the ramming stage of the underlying layer;

FIG. 3 shows the filling stage of the bottom layer;

FIGS. 4 and 5 illustrate the mold and the material contained therein after the preliminary pressing for the forming of the impression in the bottom layer, and a view taken along the line V—V of FIG. 4;

FIG. 6 illustrates the mold after the filling stage with the second coloured material for the pattern forming;

FIG. 7 illustrates the pressing stage of the second coloured material with impressions similar to those of the first layer;

FIG. 8 illustrates an elimination stage of the second excess material;

FIG. 9 illustrates the mold with the materials forming the slabs ready for the final pressing;

FIG. 10 illustrates a pressed slab, in a partial enlarged view.

In the drawings, 1 denotes the lower stationary pad of the mold and 2 denotes the frame in whose recess the pad 1 penetrates from underneath, to form a firm support during the pressing stages.

In the initial stage, the material A designed for forming an underlayer is introduced into the mold (see FIG. 1) and the layer of relatively soft material thus loaded may undergo a first pressing stage to ram the layer A and obtain in this way a layer $A_1$ (see FIG. 2). This pressing may be obtained with a pad 3, which is advantageously provided with a peripheral shoulder $3a$; by means of said shoulder $3a$, the peripheral edges are rammed more and thus reinforced owing to the set-up of a peripheral depression $A_2$ in said rammed layer $A_1$. Then a layer B of material is introduced to complete the bottom layer (see FIG. 3); the layer B which is designed partly to form the upper layer to be displayed, is a relatively more precious and also coloured material, while the layer A has a cheap composition. By means of a second pad 4, provided with impressions $4a$, a light preliminary pressure is imposed on the layer B to form an impression on the upper surface thereof; said impression determines the forming of recesses $B_0$ and shoulders $B_1$, being sufficiently rammed so that they do not fall down during the subsequent filling operations of the mold; the impressions $4a$ are shaped according to the desired pattern, so as to expose on the surface—when the slab is finished—the material of the layer B according to the desired pattern, in the zones of the shoulders $B_1$. It is to be noted that the loading of the mold is effected every time to the level of the upper surface of the frame 2. The height of the loaded layer thus depends upon the relative pressure of the lower pad 1 and of the frame 2 and upon the thickness of the previously introduced layers; therefore, the shoulders or reliefs $B_1$ (which may be continuous or discontinuous) after the pressing of the layer B, will result at least slightly lowered with respect to the frame upper surface.

After forming the impressions with the pad 4, an appropriate difference of level is set up between the upper surface of the frame 2 and the lower surface of the impressions $B_0$, by means of a relative movement between the members 1 and 2. Then the mold is loaded with a second precious material C having a colour different from that of the material B; the material C fills the cavities of the impressions $B_0$ formed on the layer B, and is also located above the shoulders or reliefs $B_1$. Subsequently the pressing of the second precious material C is effected in the zone of the impressions $B_0$; for this purpose it is possible to use a pad 5 provided with shoulders $5a$ corresponding to the depressions $B_0$ filled with the material C. The material C therefore is pressed in the zones of the recesses $C_0$ with a ramming corresponding to that of the material B; the other zones of the material C may also be rammed only slightly or not be rammed.

Then the excess of the material C is eliminated at least down to the bottom of the depression $C_0$. For this purpose, the frame 2 is lowered (eventually by means of pins 5b of the pad 5), and the excess of the material C—relatively very soft—is removed with a grazer 6 (FIG. 8). This operation does not alter the arrangement of the material C, which remains in the mold, as the latter is rammed, while the removed material is recoverable as a loose material.

The mold at this point is loaded as shown in FIG. 9; the final pressing is attained to obtain a slab formed as shown in FIG. 10. A quick smoothing operation will positively emphasize the exact contours of the pattern, obtained by the shoulders $B_1$ owing to the removal of the excess of layer C above said shoulders or reliefs $B_1$; the pattern is revealed by the contrast between the colours of the materials forming the layers B and C.

What I claim is:

1. A method for manufacturing cement pattern slabs by means of a mold including a frame; a lower pad; upper pressing pads penetrating from above into said frame; and trimming means sliding on the frame's upper surface, said method comprising the steps of introducing into the open mold onto said lower pad a first layer (A) of a substantially powdered cement material having a low moisture content sufficient to allow setting after pressing; next first pressing said first layer (A) with a first pad, said pressing also including the formation of a peripheral depression on the first layer relative to the central zone; next introducing into the open mold a second layer (B) comprising a cement material powdered and colored to form part of the visible surface; then second pressing with a pattern pad to form a set of impressions and pattern projections on the surface of said second layer; filling the open mold with a third layer (C) of powdered colored cement material to form the residual portion of the visible surface; then third pressing with a pattern pad to form in said third layer a set of impressions and pattern projections substantially equal to those previously formed in said second layer, said impressions having less depth than the thickness of said third layer after pressing; adjusting the relative positions of said frame and of said lower pad so that a portion of the pressed material of said third layer (C) projects from said frame by a thickness corresponding at least to the depth of the impressions of said third layer and less than the total thickness of said third layer; trimming to remove the excess portion of material of said third layer (C) projecting from said frame and finally strongly pressing the residual material contained in the mold.

References Cited

UNITED STATES PATENTS

| | | | |
|---|---|---|---|
| 1,228,538 | 6/1917 | Dennison. | |
| 2,101,540 | 12/1937 | Gullich | 264—308 X |
| 2,434,477 | 1/1948 | Winter | 264—77 |
| 1,212,331 | 1/1917 | Denivelle | 264—256 |
| 1,792,844 | 2/1931 | Knecht | 25—41.5 |
| 2,672,670 | 3/1954 | Rhodes | 264—333 |
| 3,179,730 | 4/1965 | Ingrassia | 264—245 |
| 3,270,113 | 8/1966 | Longinotti | 264—245 |
| 2,038,801 | 4/1936 | McQuade | 264—245 |
| 1,311,362 | 7/1919 | Walling | 264—256 |

ROBERT F. WHITE, Primary Examiner

K. J. HOVET, Assistant Examiner

U.S. Cl. X.R.

264—245, 256, 308, 333